United States Patent Office 2,788,763
Patented Apr. 16, 1957

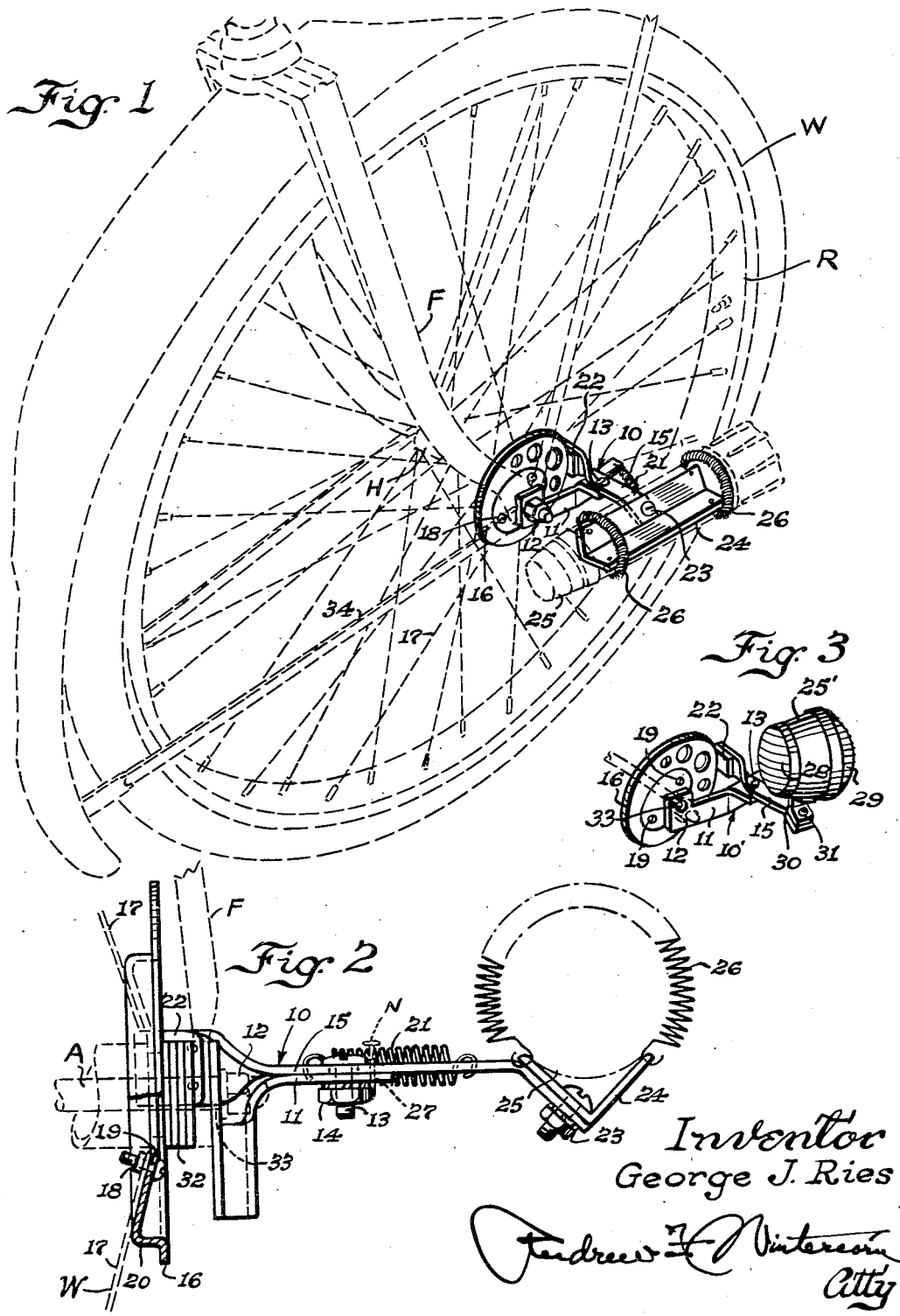

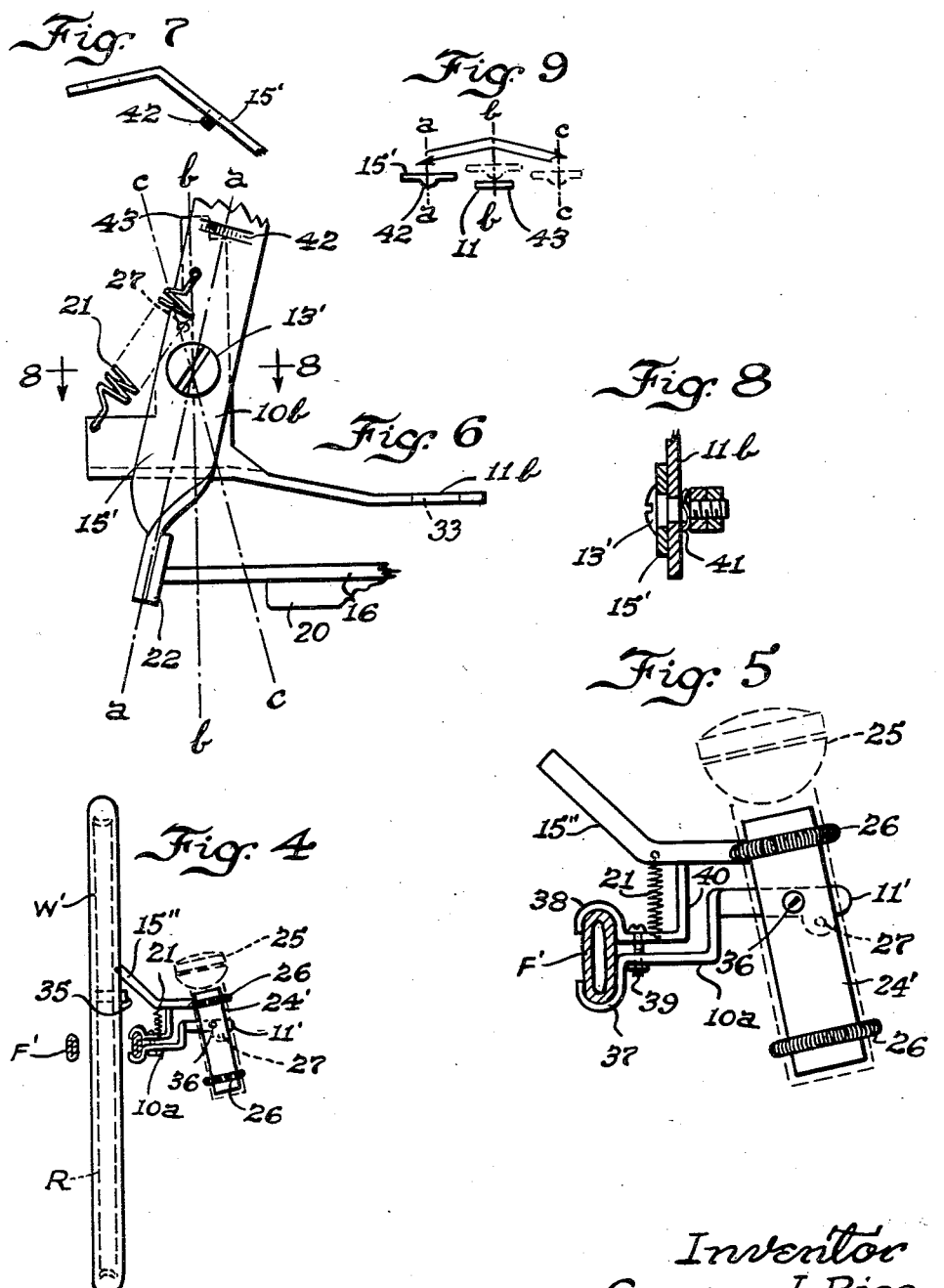

2,788,763
WIG-WAG BICYCLE LIGHT
George J. Ries, Hinsdale, Ill.
Application January 27, 1955, Serial No. 484,496
18 Claims. (Cl. 116—56)

This invention relates to a wig-wag bicycle light or light holder and means for attaching the same to bicycles for operation automatically in the forward travel thereof.

The principal object of my invention is to provide a simple and economical as well as easily installable oscillating safety light, the use of which by youngsters will save lives and teach good safety habits by emphasizing the importance of a well-lighted vehicle for late evening riding. The idea of the wig-wag motion is to attract attention by simulating the flasher lights on police and fire cars and ambulances and modern streamliner trains, so that the drivers of automobiles can instantly spot the bicycle from afar and thereby avert an accident. This device also makes for greater safety from the standpoint that it enables the rider to see a larger width of roadway while riding at night, because of the wide sweep obtained with the oscillating motion of the light. To further insure attracting motorists' attention and thus increase the safety value of the light, I may construct the device to give a combination wig-wag and up and down motion. I may also provide a special two-way light, showing red to the rear, to increase the safety value, and, of course, a pair of lights, one on each side of the front wheel, may be used instead of just one.

The device of my invention, in its preferred form, comprises a cam scurely fastened to the spokes of the front wheel, the axle of this wheel passing through the center of the cam, and a bracket mounted on the axle and securely clamped against the front fork by the axle nut, bracket carrying a spring-pressed follower or rocker arm pivoted intermediate its ends on said bracket, the arm having on one end a wear pad of durable composition bearing against the periphery of the cam, while the other end of the arm carries either a holder with facilities for detachable support of a flashlight or has a two-way light fixed thereon.

It is a simple matter to secure the spring-pressed arm by means of a pin or nail in a retracted position for daytime use of the bicycle to save needless wear and tear on the device, and in another form where a lug secured onto the wheel rim strikes an oscillatable, spring-pressed arm carrying the light, the arm may be swung to a retracted out of the way position for a similar reason.

The invention is illustrated in the accompanying drawings, in which—

Fig. 1 is a phantom view of the front portion of a bicycle showing in perspective a wig-wag bicycle light holder made in accordance with my invention mounted thereon;

Fig. 2 is a rear elevation of the device showing again in phantom adjacent portions of the wheel and front fork;

Fig. 3 is a perspective similar to Fig. 1 showing a modified or alternative construction, incorporating a two-way light as a part thereof;

Fig. 4 is a plan view of another similar device which is operable by a striker lug carried on the rim of the front wheel;

Fig. 5 is an enlarged plan view of the device appearing in Fig. 4;

Fig. 6 is a plan view of still another device operated by a cam similarly as the one shown in Figs. 1 and 2 but constructed so as to give compound movement to the light holder, namely, sidewise oscillation combined with up and down oscillation;

Fig. 7 is a side elevational detail of one of the parts shown in Fig. 6;

Fig. 8 is a sectional detail on the line 8—8 of Fig. 6, and

Fig. 9 is a motion diagram for the device of Figs. 6–8.

Similar reference numerals are applied to corresponding parts throughout the views.

Referring to the drawings, and more particularly to Figs. 1 and 2, the reference numeral 10 designates the new wig-wag bicycle light or light holder provided in accordance with my invention. It comprises a bracket 11 mounted on the bicycle front wheel axle A and rigidly clamped in place against the outside of the leg of the fork F of the bicycle by the axle nut 12. Pivotally secured on said bracket by bolt 13 and nut 14 is the oscillatable follower or rocker arm 15, one end of which rides on the periphery of a stamped sheet metal cam 16 that is securely fastened to the spokes 17 of the wheel W of the bicycle by Tinnerman nuts on bolts 18 entered through circumferentially spaced holes or slots 19 provided in the eccentric embossed hub portion 20 of the cam, which is accurately centered with respect to the hub A of the wheel. A tension spring 21 acting between the bracket 11 and the other end of the arm 15 keeps it bearing steadily on the cam 16 so that the arm will be given one oscillation per revolution of the wheel, unless the arm is purposely held in a retracted position, as later described, during daytime use of the bicycle, to save needless wear and tear on the device 10. A pad 22 of any suitable wear resistant material is preferably provided on the cam engaging end of the arm 15. The arm 15 has bolted on its other end as at 23 an elongated trough 24 disposed substantially horizontally in right angle relationship to the arm for support of a conventional cylindrical shaped flashlight 25, which is shown as detachably secured near its opposite ends by wrap-around tension springs 26 that have their extremities hooked in openings provided therefor in the edge portions of the trough, these springs it being understood requiring some stretching to enter the flashlight so as to grip the case thereof tightly enough so it will not slip out when the bicycle is rolling and the device 10 is giving the light the wig-wag motion. A pin or nail indicated in dotted lines at N in Fig. 2 is adapted to be entered through a hole 27 in the bracket 11 shown in Figs. 2 and 6 whereby to lock the arm 15 (or 15') releasably in a retracted position relative to cam 16 when the bicycle is to be used during the daytime and the wig-wag motion of the light holder 24 would be to no purpose and the flashlight 25 is removed. There is no danger of the nail N coming out because the spring 21 is stretched a little farther than usual when the pin is inserted in hole 27 and presses the arm 15 (or 15') firmly against the pin to hold it in place. In lieu of a holder 24 for a flashlight 25 I may provide as an assembled part of the device 10' as shown in Fig. 3 a two-way electric light 25' having a red lens 28 on the back and an uncolored lens 29 on the front, whereby to give a more effective signal both ways as the bicyclist rides along an unlighted roadway, the wig-wag of the red light 28 being more certain to attract the attention of drivers in oncoming traffic from the rear than would a steady light or even the wig-wag of the forwardly directed flashlight 25. Light 25' is shown as adjustably but rigidly secured to arm 15 by bracket 30 and bolt 31. Device 10' is otherwise the same as device 10 and is operated the same way, as indicated. In both constructions, after the cam 16 is carefully centered with respect to the right side of the wheel W it is fastened to the spokes 17 by the nuts on bolts 18. Then a few spacer washers 32 are placed on the right end of axle A, as indicated in Fig. 2, before the wheel is assembled in the fork F so the cam 16 won't scrape on the fork as the wheel turns. Then the bracket 11 is assembled on the axle A in abutment with the outside of the fork F, using a hole 33 in the bracket through which to extend the axle, and then the axle nut 12 is applied, after assembling the fender arms 34 on the axle, and basket supporting arms too, if the bicycle is equipped with a basket having such support. The bracket 11 should be clamped in a substantially horizontal position because the higher the light beam is wig-wagged the better the signal is noticed by drivers in the oncoming traffic. This is especially important with the form of Fig 3 in order to have both light signals 28 and 29 at about the same level.

The device 10a of Figs. 4 and 5 is closely related to devices 10 and 10' of Figs. 1-3. However, in this device, a lug 35 is suitably secured to the rim R of the wheel W' and engages a tappet arm 15" directly and rigidly secured to one end of an elongated light holder 24' pivoted intermediate its ends, as at 36, a bracket 11', that is secured to fork F' by jaws 37 and 38 when they are drawn together by one or more bolts 39. Jaw 38 provides a stop projection 40 for engagement by arm 15" in one limit position, a tension spring 31 serving normally to return the arm 15" to this position after it has been moved positively to the other extreme position by engagement with lug 35. Here again, the holder 24' may have a flashlight 25 secured thereon by springs 26, as in Figs. 1 and 2, or it may carry a light 25', as in Fig. 3. Also, a pin or nail N may be inserted in a hole 27 when the holder 24' is swung to a position corresponding to an out of the way position of tappet arm 15" relative to lug 35 to keep the device 10a from being operated while the bicycle is used in the daytime. The operation of this device 10a is, therefore, closely similar to the ones shown in Figs. 1-3.

The device 10b of Figs. 6-9 is closer to those shown in Figs. 1-3. The difference is that the rocker arm 15' is not only oscillated by cam 16 but in this oscillatory movement is given an up and down motion, as shown at b—b in the diagram Fig. 9, with a view to better insuring that the attention of drivers in the vicinity will be called to the bicycle. To obtain this up and down motion combined with the oscillatory motion it is necessary only to pivot the arm 15' with freedom to move up and down bodily and, by cam action, cause the arm to rise and, by spring action, cause the arm to fall again, in each forward and return motion. Thus bolt 13 is replaced by a special bolt 13' which has a wavy spring washer 41 assembled on it under bracket 11b, and this washer is compressible enough to allow the arm 15' to rise relative to the bracket 11b (line b—b) and serves to return it again (lines a—a and c—c). A cam-shaped projection 42 provided on arm 15' rides up onto and over a lug 43 on the end of bracket 11b in each back and forth swing of the arm and thereby raises the arm relative to the bracket at the middle of each swing, as seen at b—b in Fig. 9. The light, of course, is given corresponding compound motion, and that light may be a flashlight 25 or a two-way light 25'.

It is believed the foregoing description conveys a good understanding of the objects and advantages of my invention. The appended claims have been drawn to cover all legitimate modifications and adaptations.

I claim:

1. The combination with a vehicle wheel, of an arm pivotally mounted for oscillation about a substantially vertical axis with respect to a supporting bracket carried on the vehicle, said arm carrying a signal light to be wig-wagged by oscillation of said arm, and means connected with said vehicle wheel at the central portion thereof to transmit oscillatory motion to said arm when the vehicle is in motion.

2. The combination with a vehicle wheel, of an arm pivotally mounted intermediate its ends for oscillation with respect to a supporting bracket carried on the vehicle, said arm carrying on its one end a signal light to be wig-wagged by oscillation of said arm, a cam turning with said wheel relative to and engaging the other end of said arm, and spring means holding said arm in contact with said cam so that said arm is oscillated when the vehicle is in motion.

3. The combination set forth in claim 2 including means for holding said arm in a retracted position with respect to said cam against the action of said spring means, when the oscillatory motion of the arm during the motion of the vehicle is not needed.

4. The combination with a vehicle wheel of an arm pivotally mounted for oscillation with respect to a supporting bracket carried on the vehicle, said arm carrying a signal light to be wig-wagged by oscillation of said arm, a striker projection mounted on the wheel and arranged to strike and swing said arm in one direction when the vehicle is in motion, and spring means for returning said arm to a predetermined position.

5. The combination set forth in claim 4 including means for holding said arm in a retracted position with respect to said striker projection against the action of said spring means, when the oscillatory motion of the arm during the motion of the vehicle is not needed.

6. The combination with a vehicle wheel, of an arm pivotally mounted for oscillation in a substantially horizontal plane with respect to a supporting bracket carried on the vehicle, said arm carrying a signal light to be wig-wagged by oscillation of said arm, means connected with said vehicle wheel to transmit oscillatory motion to said arm when the vehicle is in motion, and means for causing up and down motion of the arm in its horizontal oscillation.

7. The combination with a vehicle wheel, of an arm pivotally mounted intermediate its ends for oscillation in a substantially horizontal plane with respect to a supporting bracket carried on the vehicle, said arm carrying on its one end a signal light to be wig-wagged by oscillation of said arm, a cam turning with said wheel relative to and engaging the other end of said arm, spring means holding said arm in contact with said cam so that said arm is oscillated when the vehicle is in motion, and means for causing up and down motion of the arm in its horizontal oscillation.

8. The combination set forth in claim 7 including means for holding said arm in a retracted position with respect to said cam against the action of said spring means, when the oscillatory motion of the arm during the motion of the vehicle is not needed.

9. A device of the character described comprising a bracket adapted to be mounted on the front axle of a bicycle and clamped against the outside of the fork by the axle nut, an arm pivoted intermediate its ends on said bracket for oscillation in a substantially horizontal plane, a cam secured to the hub portion of the front wheel to turn with the wheel and arranged to engage one end of said arm to transmit oscillatory motion thereto, spring means holding said arm in contact with said cam, and a signal light carried on the other end of said arm for wig-wag movement with the arm in the oscillation thereof.

10. A device as set forth in claim 9 wherein the bracket has a hole provided therein receiving a pin for holding the arm in a retracted position with respect to said cam against the action of said spring means.

11. A device as set forth in claim 9 including an elongated trough fixed on the last mentioned end of said arm in transverse relationship thereto and in a substantially horizontal plane having means on the opposite ends thereof for releasably securing the casing of an elongated flashlight in the trough.

12. A device of the character described comprising a bracket adapted to be mounted on the front axle of a bicycle and clamped against the outside of the fork by the axle nut, an arm pivoted intermediate its ends on said bracket for oscillation in a substantially horizontal plane, a cam secured to the hub portion of the front wheel to turn with the wheel and arranged to engage one end of said arm to transmit oscillatory motion thereto, spring means holding said arm in contact with said cam, and a two-way signal light carried on the other end of said arm for wig-wag movement with the arm in the oscillation thereof, said light having a colored lens on the back thereof for a caution signal and an uncolored lens on the front thereof for combination illumination and caution signal.

13. A device of the character described comprising a bracket adapted to be mounted on the front axle of a bicycle and clamped against the outside of the fork by the axle nut, an arm pivoted intermediate its ends on said bracket for oscillation in a substantially horizontal plane, a cam secured to the hub portion of the front wheel to turn with the wheel and arranged to engage one end of said arm to transmit oscillatory motion thereto, spring means holding said arm in contact with said cam, and a signal light carried on the other end of said arm for wig-wag movement with the arm in the oscillation thereof, the pivot for said arm permitting up and down motion of the arm relative to the bracket, spring means normally urging said arm in one direction, and cam means which in the oscillation of said arm relative to said bracket causes vertical movement of at least the light carrying end of the arm in the horizontal oscillation thereof.

14. A device as set forth in claim 13 wherein the bracket has a hole provided therein receiving a pin for holding the arm in a retracted position with respect to said cam against the action of said spring means.

15. A device as set forth in claim 13 including an elongated trough fixed on the last mentioned end of said arm in transverse relationship thereto and in a substantially horizontal plane having means on the opposite ends thereof for releasably securing the casing of an elongated flashlight in the trough.

16. The combination with a vehicle wheel, of an arm pivotally mounted for oscillation about a substantially vertical axis with respect to a supporting bracket carried on the vehicle, means for detachably securing a flashlight onto said arm to be wig-wagged in the oscillation thereof, and means connected with said vehicle wheel at the central portion thereof to transmit oscillatory motion to said arm when the vehicle is in motion.

17. The combination set forth in claim 16 including means for holding said arm releasably in an inoperative position.

18. The combination with a vehicle wheel, of an arm pivotally mounted for oscillation about a substantially vertical axis with respect to a supporting bracket carried on the vehicle, said arm carrying a signal light to be wig-wagged by oscillation of said arm, means connected with said vehicle wheel at the central portion thereof to transmit oscillatory motion to said arm when the vehicle is in motion, and means for holding said arm releasably in an inoperative position.

References Cited in the file of this patent

UNITED STATES PATENTS

| 595,334 | Paehtz | Dec. 14, 1897 |

FOREIGN PATENTS

| 414,096 | Great Britain | July 30, 1934 |
| 771,626 | France | July 30, 1934 |